United States Patent
Guan et al.

(10) Patent No.: US 9,340,075 B2
(45) Date of Patent: May 17, 2016

(54) REPEATER FOR TIRE PRESSURE MONITORING SYSTEM (TPMS) AUTO LOCALIZATION

(71) Applicant: Infineon Technologies AG, Neubiberg (DE)

(72) Inventors: Lifeng Guan, Singapore (SG); Yoon Fatt Foo, Singapore (SG); Wai Keung Chan, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 3 days.

(21) Appl. No.: 14/312,962

(22) Filed: Jun. 24, 2014

(65) Prior Publication Data
US 2015/0367692 A1 Dec. 24, 2015

(51) Int. Cl.
*B60C 23/00* (2006.01)
*B60C 23/04* (2006.01)

(52) U.S. Cl.
CPC .................................. *B60C 23/0455* (2013.01)

(58) Field of Classification Search
CPC ............. B60C 23/044; B60C 23/0452; B60C 23/0418; B60C 23/0442; B60C 23/0444; B60C 23/045; B60C 23/0454; B60C 23/0461; B60C 23/0462; B60C 23/0416; B60C 23/0488; B60C 23/0459; B60C 23/0489
USPC ............. 340/447, 438, 425.5, 445, 442, 444, 340/443, 426.33, 426.24, 612
See application file for complete search history.

(56) References Cited

U.S. PATENT DOCUMENTS

| 2002/0003474 | A1* | 1/2002 | McClelland | B60C 23/0416 340/442 |
|---|---|---|---|---|
| 2006/0071768 | A1* | 4/2006 | Iwazumi | B60C 23/0408 340/447 |
| 2007/0007343 | A1* | 1/2007 | Ganz | G06K 19/0723 235/435 |
| 2007/0069877 | A1* | 3/2007 | Fogelstrom | B60C 23/005 340/442 |
| 2009/0066498 | A1* | 3/2009 | Jongsma | B60C 23/0416 340/447 |
| 2012/0200408 | A1 | 8/2012 | Gotschlich et al. | |
| 2013/0166166 | A1* | 6/2013 | Steiner | B60C 23/0416 701/71 |
| 2015/0061853 | A1* | 3/2015 | Yu | B60C 23/009 340/445 |

FOREIGN PATENT DOCUMENTS

EP 2018980 A1 1/2009

OTHER PUBLICATIONS

Infineon. "Infineon TPMS Overview". Product Sheet. Jun. 26, 2012.

* cited by examiner

*Primary Examiner* — Daniel Previl
(74) *Attorney, Agent, or Firm* — Eschweiler & Associates, LLC

(57) ABSTRACT

A TPMS auto localization system for on-demand tire parameter acquisition and an associated method includes a central unit configured to receive and transmit radio-frequency (RF) signals, and a tire module associated with a tire. The tire module is configured to measure one or more tire parameters based on a received low frequency (LF) command and transmit the one or more tire parameters to the central unit. A repeater module is associated with the tire module, and is configured to receive the RF signal from the central unit and translate the RF signal into a LF command to be transmitted to the tire module.

20 Claims, 4 Drawing Sheets

DIRECT TPMS SYSTEM
100

REPEATER FOR TIRE PRESSURE MONITORING SYSTEM (TPMS) AUTO LOCALIZATION

FIELD

The present disclosure relates to Tire Pressure Monitoring Systems (TPMS) with Auto Localization and in particular to a repeater module associated therewith and a method for on-demand tire parameter acquisition.

BACKGROUND

Modern day automobiles are equipped with many electronic systems which monitor various vehicle parameters and pass the information to the driver of the vehicle. A tire pressure monitoring system (TPMS) is such an electronic system designed to monitor the air pressure inside tires on various types of vehicles. TPMS report real-time tire-pressure information to the driver of the vehicle, either via a gauge, a pictogram display, or a simple low-pressure warning light. A TPMS with an auto localization feature is able to locate the exact tire which transmits the data.

For on-demand tire parameter acquisition, for example Pressure-On-Demand (POD), it is so far approached by bi-directional TPMS which needs to install a LF antenna at the wheel base above each individual wheel and lay cables at the vehicle level to connect the LF antenna to the central receiver unit. However, wire cabling at the vehicle level incurs significant cost for an original equipment manufacturer (OEM). Therefore such a bi-directional TPMS approach is only for a limited volume of vehicles and is not wide spread for TPMS application.

SUMMARY

In one embodiment of the disclosure, a TPMS auto localization system for on-demand tire parameter acquisition comprises a central unit configured to receive and transmit radio-frequency (RF) signals. The system further comprises a tire module associated with a tire, and configured to measure one or more tire parameters based on a received low frequency (LF) command and transmit the tire parameter to the central unit. A repeater module is associated with the tire module and is configured to receive the RF signals from the central unit and translate the RF signals into a LF command to be transmitted to the tire module.

In another embodiment of the disclosure, a repeater module in a TPMS auto localization system comprises a RF receiver configured to receive a radio-frequency (RF) signal from a central unit and a translation circuit and/or software configured to selectively translate the RF signal to a LF command based on a condition. The repeater module further comprises a LF transmitter configured to receive the LF command from the translation circuit and/or software and transmit the low frequency (LF) command to a tire module.

In another embodiment of the disclosure, a method for on-demand tire parameter acquisition is disclosed. The method operates in conjunction with a TPMS auto localization system within the vehicle, which further comprises a central unit configured to receive and transmit radio frequency (RF) signals. The system further comprises a tire module associated with a tire configured to measure one or more tire parameters based on a received low frequency (LF) command and transmit the tire parameter to the central unit, and a repeater module associated with the tire module configured receive the RF signal from the central unit and translate the RF signal into the LF command to be transmitted to the tire module. The method comprises generating a RF signal containing a module ID and an instruction to address the tire module within the central unit, and transmitting the RF signal from the central unit to the repeater module. The method further comprises translating the RF signal into the LF command within the repeater module, based on a condition, transmitting the LF command from the repeater module to the tire module, determining the tire parameters based on the LF command and transmitting the measured tire parameters from the tire module to the central unit.

BRIEF DESCRIPTION OF THE DRAWINGS

In the following, the disclosure will be further explained and described by means of specific example embodiments with reference to the enclosed drawings.

DETAILED DESCRIPTION

Figure 1:
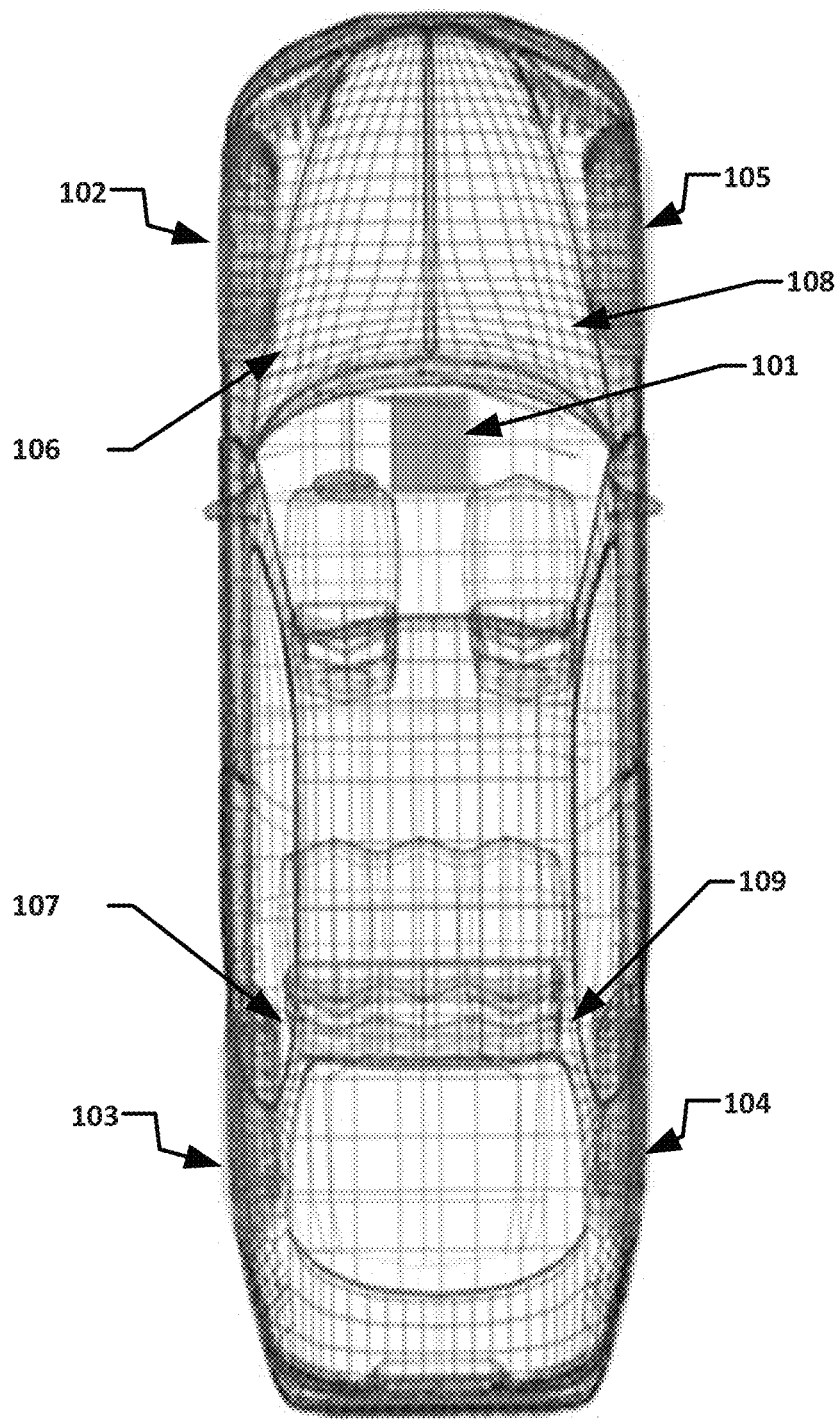
FIG. 1 shows a schematic diagram of a typical direct TPMS system.

The present disclosure will now be described with reference to the attached drawing figures, wherein like reference numerals are used to refer to like elements throughout, and wherein the illustrated structures and devices are not necessarily drawn to scale.

This disclosure is directed towards a system and method for on-demand tire parameter acquisition using a TPMS auto localization system with a repeater module. The TPMS auto localization system can be defined as a direct TPMS system which is able to locate the exact tire position at which a tire module transmits the tire parameters. A typical direct TPMS comprises a tire module which includes a pressure sensor directly mounted on the wheels or tires of a vehicle and a central receiver unit. The pressure inside the tire is measured using a pressure transducer with the pressure information being subsequently sent to the vehicle (the central receiver unit) to warn the driver of under or over inflation of a tire. The pressure information is transmitted to the vehicle using radio frequency (RF) signals.

The on-demand tire parameter acquisition is typically achieved through a bi-directional TPMS, wherein the tire modules send the tire parameters to the central unit only after a request from the central receiver unit. In a conventional system, the bi-directional TPMS was implemented by installing a LF antenna at the wheel base above each individual wheel and laying cables at the vehicle level to connect the LF antenna to the central receiver unit. However, wire cabling at the vehicle level incurs significant cost and also requires relatively high maintenance. To provide a less expensive and lower maintenance alternative, an additional hardware module "RF Rx/LF Tx repeater" (abbreviated as "repeater") is introduced in the present disclosure. The repeater module is installed at a position close to each individual tire, e.g., the tire's wheel base. In some implementations, this repeater module can eliminate the wire cabling at the vehicle level, wirelessly connecting the LF antenna at the wheel base to the central receiver unit. In the present disclosure, the TPMS auto localization system is implemented using the repeater module between the central unit and the LF antenna at the wheel base.

In one embodiment, FIG. 1 depicts a direct TPMS system 100 which includes a central receiver unit 101 and tire modules 102, 103, 104 and 105 respectively, on each of the tires of the vehicle. In other embodiments, the tire modules can be on one or more of the tires of the vehicle. The tire modules comprise a pressure transducer which is configured to measure the pressure information and to subsequently transmit the information to the central receiver unit 101. The tire modules transmit the information to the central unit 101 using RF signals. Further the tire modules comprise a RF transmitter configured to transmit the pressure information to the central unit 101, sensors (pressure, acceleration, temperature, and battery voltage), antennas (LF, RF), a microcontroller and a battery. The central unit 101 comprises a RF receiver configured to receive the pressure information from the tire modules, antennas (LF, RF), a microcontroller and an internal power supply.

To achieve on-demand tire parameter acquisition, bi-directional TPMS is employed, wherein the tire modules 102, 103, 104, 105 are configured to send the tire parameters to the central unit only after a request from the central receiver unit 101. Particularly, in this disclosure, an additional hardware "repeater" is introduced between the central unit and the tire modules for this purpose. The repeater modules are installed at positions close to each individual tire, whose positions are depicted in FIG. 1 by reference numerals 106, 107, 108 and 109 respectively.

Figure 2:
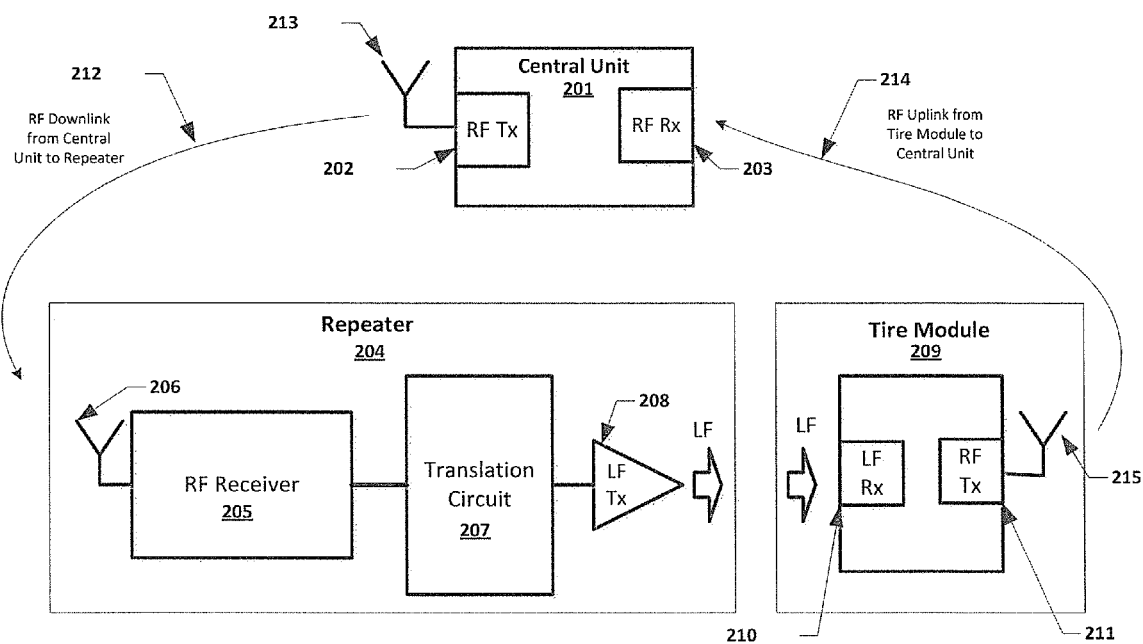
FIG. 2 shows a schematic diagram of a TPMS auto localization system with a repeater module.

FIG. 2 shows a particular embodiment wherein a TPMS auto localization system 200 with a repeater module 204 is used for on-demand tire parameter acquisition. The TPMS auto localization system 200 comprises a central unit 201, a tire module 209 at or within a tire, and a repeater module 204 installed at a location close to the tire module 209. Further, the TPMS auto localization system 200 comprises a RF downlink 212 comprising a RF transmit antenna 213 from the central unit 201 to the repeater 204 and a RF uplink 214 comprising a RF transmit antenna 215 from the tire module 209 to the central unit 201. In one particular embodiment, the RF downlink and uplink use a frequency of 433.92 MHz. However, the RF downlink and uplink can use any approved UHF frequency band approved in different countries.

The central unit 201 of FIG. 2 comprises a RF transmitter circuit 202 configured to generate a RF signal and transmit the RF signal to the repeater module 204 via the RF downlink 212. Further, the central unit 201 comprises a RF receiver circuit 203 configured to receive the tire parameters from the tire module 209. The RF signal transmitted from the central unit 201 is received by the repeater module 204 which then translates the received RF signal into a LF command to be transmitted to the tire module 209. The tire module 209 comprises a LF receiver 210 which is configured to receive the LF command from the repeater module 204. The tire module 209 then measures one or more tire parameters based on the received LF command and transmits the tire parameters to the central unit 201 via the RF transmitter 211.

In one embodiment, the central unit 201 is configured to transmit the RF signal only upon activation by an activation signal. In other embodiments, however, the central unit 201 can transmit the RF signal without activation. The activation signal can be a manual trigger like a driver pushing a button or an internal software trigger.

In one embodiment, the RF signal generated by the central unit 201 comprises a module ID configured to identify a particular repeater module 204 and an instruction to be used by the repeater module 204 to address the tire module 209. Further, the repeater module 204 comprises a module ID that uniquely identifies the respective repeater module from other modules associated with other tires of the vehicle.

Referring back to FIG. 2 again, the repeater module 204 comprises a RF receiver 205 configured to receive the RF signal from the central unit 201, a translation circuit and/or software 207 configured to selectively translate the RF signal to a LF command based on a module ID match and a LF transmitter configured to receive the LF command from the translation circuit and/or software 207 and transmit the LF command to the tire module 209. In one embodiment, the RF receiver 205 of the repeater module 204 is configured to operate at any approved sub 1 GHz UHF ISM band and the LF transmitter 208 is configured to operate at 125 kHz. Further, the translation circuit and/or software 207 is a microcontroller or ASIC in one embodiment together with necessary software, if any, however, any kind of translation circuitry and/or software can be used. As highlighted above, the translation circuit 207 can be implemented in hardware or software or as a combination of both. The repeater module 204 further comprises a module ID that uniquely identifies that particular repeater module. The repeater module 204 can be powered, in one embodiment by a battery or vehicle power supply.

The repeater module 204 of the present disclosure can be utilized in any direct TPMS system wherein the TPMS tire module has a LF receiver interface. The repeater module 204 is installed at a position close to the tire module 209 in order to facilitate the transmission of the LF command from the repeater module 204 to the tire module 209 (LF signals have short propagation distance). The repeater module 204 is normally in idle or sleep mode with the RF receiver antenna 206 operating. Once the RF receiver 205 receives the RF signal from the central unit 201, it will wake up to check whether the received signal is addressing the current repeater module 204. Checking whether the received signal is addressing the current repeater module 204 is performed in the translation circuit and/or software 207, in one embodiment, wherein the translation circuit and/or software 207 is configured to verify if the module ID contained in the RF signal received from the central unit 201 matches with the module ID of the current repeater module 204. If there is no module ID match, then the repeater module 204 goes back to the idle/sleep mode. If there is a match, then the translation circuit and/or software 207 processes the received RF signal, translates the received RF signal into a LF command, which then wakes up the LF transmitter 208 which in turn transmits the LF command to the tire module 209.

The tire module 209 is also normally in idle or sleep mode and is configured to wake up on the receipt of the LF command from the repeater 204. The tire module 209 is usually installed within the tire of the vehicle and is powered only by battery in one embodiment. Therefore, power conservation is of advantageous. Once the LF command is received, the tire module 209 wakes up and will carry out the measurement according to the LF command and transmit the tire parameters to the central unit 201 via the RF uplink 214.

Figure 3:
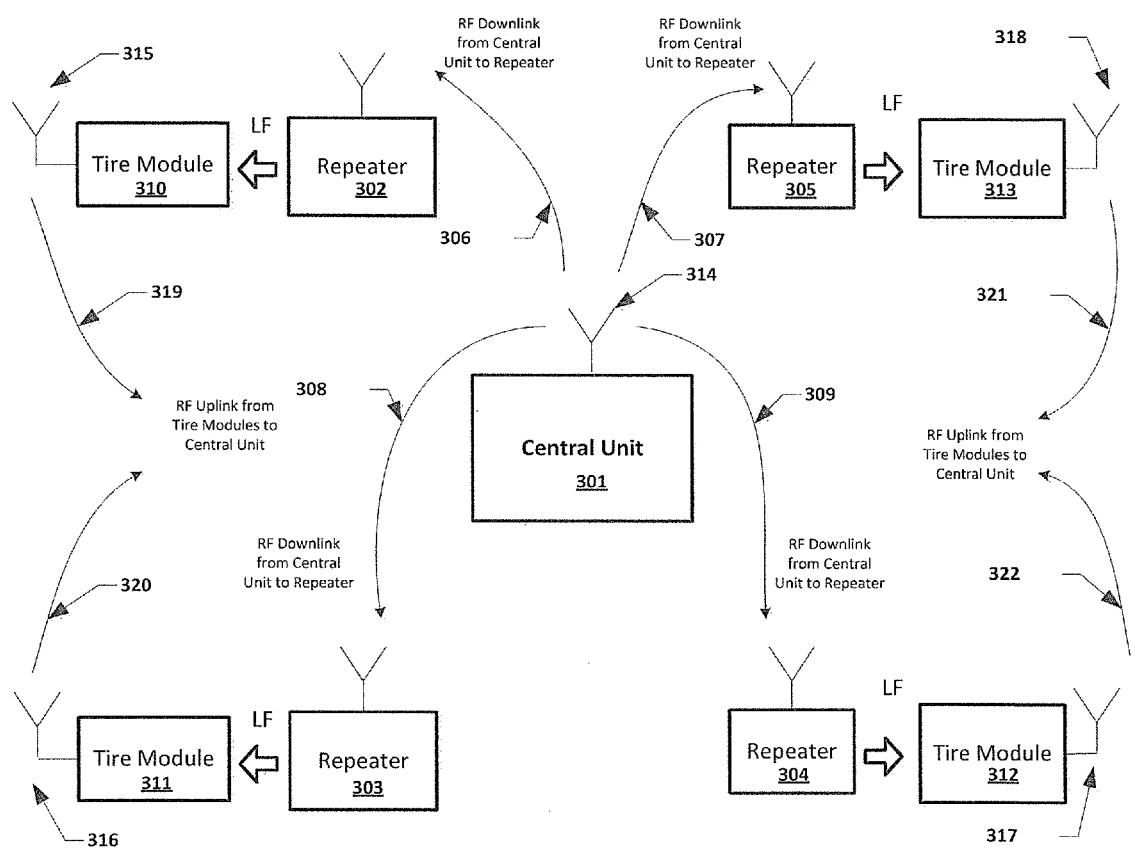
FIG. 3 shows a method for on-demand tire parameter acquisition using a TPMS auto localization system with multiple repeater modules according to one embodiment of the disclosure.

FIG. 3 shows a TPMS auto localization system 300 with four tire modules 310, 311, 312 and 313 for the four tires of the vehicle and four repeater modules 302, 303, 304 and 305 associated with the respective tire modules 310, 311, 312 and 313. However, it should be appreciated that the TPMS auto localization system 300 can comprise any number of tire modules and the associated repeater modules and can be extended to vehicles with greater than or less than four wheels. In the present disclosure, the central unit 301 is configured to transmit RF signals which comprise a module ID and an instruction to address the respective tire modules. In one embodiment, the central unit 301 transmits the RF signal upon activation by an activation signal. Alternatively, the central unit 301 may transmit the RF signal upon an instruction by a user, or upon some predetermined timing.

In one embodiment, the central unit 301 is configured to transmit the RF signals sequentially, wherein a first RF signal of the sequence comprises the instruction and the module ID identifying the first repeater 302 associated with the first tire module 310, a second RF signal of the sequence comprises the instruction and the module ID identifying the second repeater 303 associated with the second tire module 311, a third RF signal of the sequence comprises the instruction and the module ID identifying the third repeater 304 associated with the third tire module 312 and a fourth RF signal of the sequence comprises the instruction and the module ID identifying the fourth repeater 305 associated with the fourth tire module 313.

When the central unit 301 transmits the first RF signal, all the four repeater modules receive the signal simultaneously and all the repeater modules wake up to check for a module ID match. For the first RF signal, only the first repeater module 302 has a module ID match and therefore, all the other modules goes back to sleep mode. Then the first repeater module 302 translates the received RF signal into a LF command which is then transmitted to the first tire module 310. The first tire module 310 then wakes up and measures the parameters of the first tire according to the LF command and transmits the information back to the central unit 301.

Then the central unit 301 transmits the second RF signal and again all the four repeater modules receive the signal simultaneously and all the repeater modules wake up to check for a module ID match. For the second RF signal, only the second repeater module 303 has a module ID match and therefore, all the other modules goes back to sleep mode. Then the second repeater module 303 translates the received RF signal into a LF command which is then transmitted to the second tire module 311. The second tire module 311 then wakes up and measures the parameters of the second tire according to the LF command and transmits the information back to the central unit 301.

Then the central unit 301 transmits the third RF signal and again all the four repeater modules receive the signal simultaneously and all the repeater modules wake up to check for a module ID match. For the third RF signal, only the third repeater module 304 has a module ID match and therefore, all the other modules goes back to sleep mode. Then the third repeater module 304 translates the received RF signal into a LF command which is then transmitted to the third tire module 312. The third tire module 312 then wakes up and measures the parameters of the third tire according to the LF command and transmits the information back to the central unit 301.

Finally, the central unit 301 transmits the fourth RF signal and again all the four repeater modules receive the signal simultaneously and all the repeater modules wake up to check for a module ID match. For the fourth RF signal, only the fourth repeater module 305 has a module ID match and therefore, all the other modules goes back to sleep mode. Then the fourth repeater module 305 translates the received RF signal into a LF command which is then transmitted to the fourth tire module 313. The fourth tire module 313 then wakes up and measures the parameters of the fourth tire according to the LF command and transmits the information back to the central unit 301.

The method described above is just one of the many ways of implementing on-demand tire parameter acquisition and the sequence in which the method is described is not intended to be construed as a limitation. The RF signals can be transmitted sequentially or in a random manner (i.e., second RF signal after third RF signal or fourth RF signal), without departing from the spirit and scope of the subject matter described herein.

Figure 4:
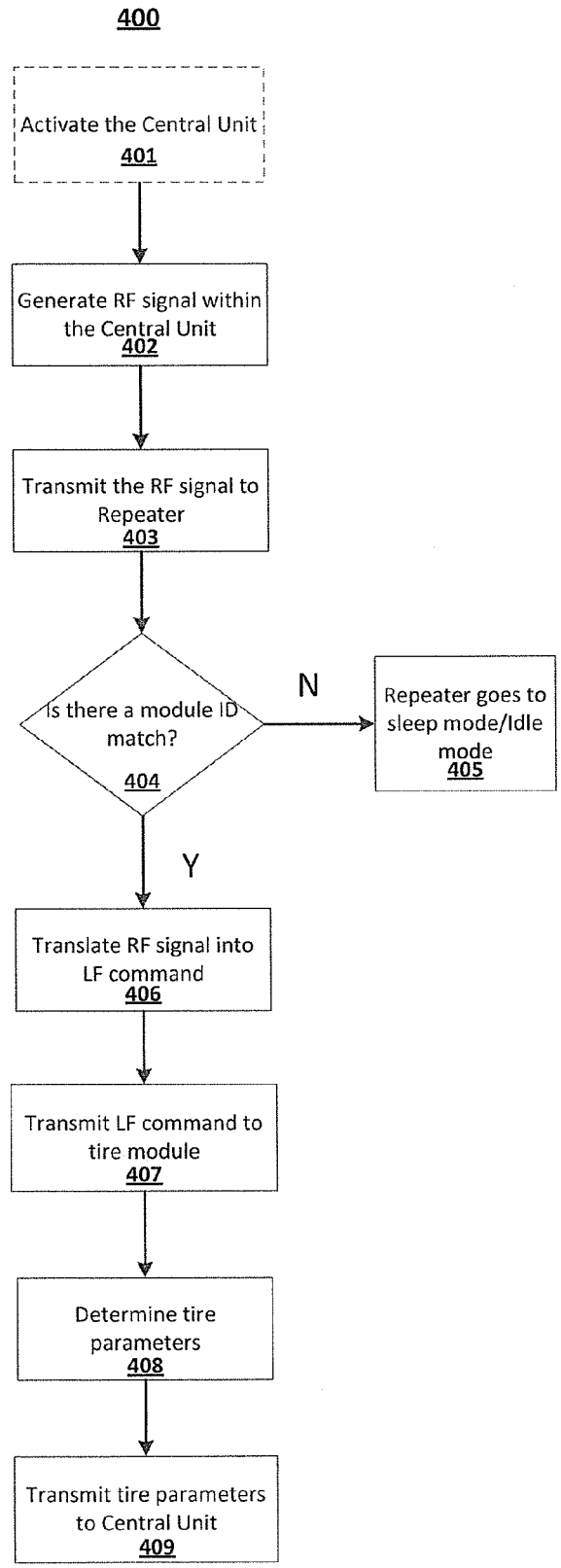
FIG. 4 shows a flowchart illustrating a method for on-demand tire parameter acquisition using a TPMS auto localization system with a repeater module according to one embodiment of the disclosure.

FIG. 4 illustrates a method for on-demand tire parameter acquisition using a TPMS auto localization system with a repeater module. The method 400 is described with reference to the TPMS localization system 200 of FIG. 2, however, the method can also be applied to TPMS auto localization systems with multiple repeater modules. In one embodiment, the method begins by activating the central unit 201. However, in other embodiments, there is no need to activate the central unit 201.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At block 401, the central unit 201 is activated. At block 402, the RF signal is generated within the central unit 201. At block 403, the RF signal is transmitted to the repeater module 204. At block 404, the repeater wakes up in response to the RF signal and checks for a module ID match. If there is a module ID match between the module ID in the RF signal and the module ID in the repeater module 204 (YES at 404), the method 400 proceeds to block 406, otherwise (NO at 404), the repeater module goes back to sleep mode. At block 406, in response to a positive module ID match, the RF signal is translated into a LF command. At block 407, the LF command is transmitted to the respective tire module 209. Because the LF command only transmits effectively a short distance, only the tire module 209 local thereto responds to the command. At block 408, the tire parameters are determined by the tire module 209 based on the LF command. At block 409, the tire parameters are transmitted by the RF transmitter of the tire module to the central unit.

As highlighted above, the TPMS auto localization system with repeater module is advantageously different compared to some of the prior art TPMS with auto localization. In one conventional solution, a manual approach is utilized wherein each tire is manually marked upon installation, however, this approach is subject to human error and may encounter problems upon tire rotation. In another solution, a two-axis G sensor is used which is able to detect z axis and x axis acceleration to differentiate the left and the right wheel, while a received signal strength indicator (RSSI) from the front and rear tire module is used to differentiate each wheel. However, RSSI is quite tricky and unstable especially when there are external environment interferences present. In yet another solution, a hybrid approach is utilized, which uses Angle Position Sensing (APS) detection from a TPMS tire module to co-relate with Wheel Speed Sensor (WSS) information available to make localization of each tire. However, the hybrid approach requires access to the wheel speed data from other vehicle system ie ABS and hence would limit the system to before market OEM systems. This also limits the system to those system manufacturers who have access to vehicle level signal.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A TPMS auto localization system for on-demand tire parameter acquisition, comprising:
    a central unit configured to receive and transmit a radio-frequency (RF) signal;
    a tire module associated with a tire, and configured to measure one or more tire parameters based on a received low frequency (LF) command and transmit the one or more tire parameters to the central unit; and
    a repeater module associated with the tire module, and configured to receive the RF signal from the central unit and translate the RF signal into a LF command to be transmitted to the tire module.

2. The TPMS auto localization system of claim 1, wherein the central unit further comprises a RF downlink comprising a RF transmit antenna configured to transmit the RF signal to the repeater module.

3. The TPMS auto localization system of claim 1, wherein the tire module further comprises a RF uplink comprising a RF transmit antenna configured to transmit the one or more tire parameters to the central unit.

4. The TPMS auto localization system of claim 1, wherein the central unit comprises a RF receiver circuit and a RF transmitter circuit.

5. The TPMS auto localization system of claim 1, wherein the central unit is configured to transmit the RF signal only upon activation by an activation signal, wherein the activation signal comprises a manual trigger or an internal software trigger.

6. The TPMS auto localization system of claim 1, wherein the central unit is configured to generate the RF signal, wherein the RF signal comprises a module ID configured to identify a particular repeater module of a plurality of repeater modules, and an instruction that is used by the particular repeater module to address the tire module.

7. The TPMS auto localization system of claim 6, wherein the central unit is configured to transmit the RF signal sequentially, and wherein a first RF signal of the sequence comprises the instruction and the module ID identifying a first repeater associated with a first tire module, and a second RF signal of the sequence comprises the instruction and the module ID identifying a second, different repeater associated with a second, different tire module.

8. The TPMS auto localization system of claim 1, wherein the repeater module is one of a plurality of repeater modules, and wherein each repeater module comprises a module ID that uniquely identifies the respective repeater module.

9. The TPMS auto localization system of claim 1, wherein the tire module comprises a LF receiver interface configured to receive the LF command and a RF transmitter configured to transmit the one or more tire parameters.

10. The TPMS auto localization system of claim 1, wherein the tire module is normally in idle or sleep mode and is configured to awake upon receipt of the LF command from the repeater module.

11. A repeater module in a TPMS auto localization system, comprising:
    a RF receiver configured to receive a radio-frequency (RF) signal from a central unit;
    a translation circuit and/or associated software configured to selectively translate the RF signal to a LF command based on a condition; and
    a LF transmitter configured to receive the LF command from the translation circuit and/or associated software and transmit the low frequency (LF) command to a tire module.

12. The repeater module of claim 11, further comprising a module ID that uniquely identifies the respective repeater module.

13. The repeater module of claim 12, wherein the translation circuit and/or associated software is configured to:
    check if a module ID contained in the RF signal received from the central unit matches with the module ID of the current repeater module; and
    translate the received RF signal into the LF command to be transmitted to the tire module, if there is a module ID match.

14. The repeater module of claim 11, wherein the LF transmitter is normally in idle or sleep mode and is configured to awake upon receipt of the LF command from the translation circuit and/or associated software.

15. The repeater module of claim 11, wherein the RF receiver is configured to operate at any approved sub 1 GHz UHF ISM band.

16. A method for on-demand tire parameter acquisition comprising:
    providing a TPMS auto localization system within the vehicle, the TPMS auto localization system comprising,
        a central unit configured to receive and transmit radio frequency (RF) signals;
        a tire module associated with a tire configured to measure one or more tire parameters based on a received low frequency (LF) command and transmit the tire parameter to the central unit; and
        a repeater module associated with the tire module configured receive the RF signal from the central unit and translate the RF signal into the LF command to be transmitted to the tire module;
    generating a RF signal containing a module ID and an instruction to address the tire module within the central unit;
    transmitting the RF signal from the central unit to the repeater module;
    selectively translating the RF signal into the LF command within the repeater module, based on a condition;
    transmitting the LF command from the repeater module to the tire module;
    determining the tire parameters based on the LF command; and
    transmitting the measured tire parameters from the tire module to the central unit.

17. The method of claim 16, wherein central unit generates the RF signal only upon activation by an activation signal, wherein the activation signal is generated by a manual trigger or an internal software trigger.

18. The method of claim 16, wherein the RF signal from the central unit is transmitted sequentially, and wherein a first RF signal of the sequence comprises the instruction and the module ID identifying a first repeater module associated with a first tire module, and a second RF signal of the sequence comprises the instruction and the module ID identifying a second, different repeater module associated with a second, different tire module.

19. The method of claim 16, wherein a LF transmitter of the repeater module is normally in idle or sleep mode and is configured to wake up when the module ID contained in the RF signal matches with a module ID of that particular repeater module.

20. The repeater module of claim 19, wherein selectively translating the RF signal into the LF command based on a condition comprises translating the RF signal into the LF command only when the module ID contained in the RF signal matches with the module ID of that particular repeater module.

* * * * *